Oct. 14, 1930.  W. HERRIOTT  1,778,027
TRANSFORMER PRINTING CAMERA
Filed Sept. 15, 1928
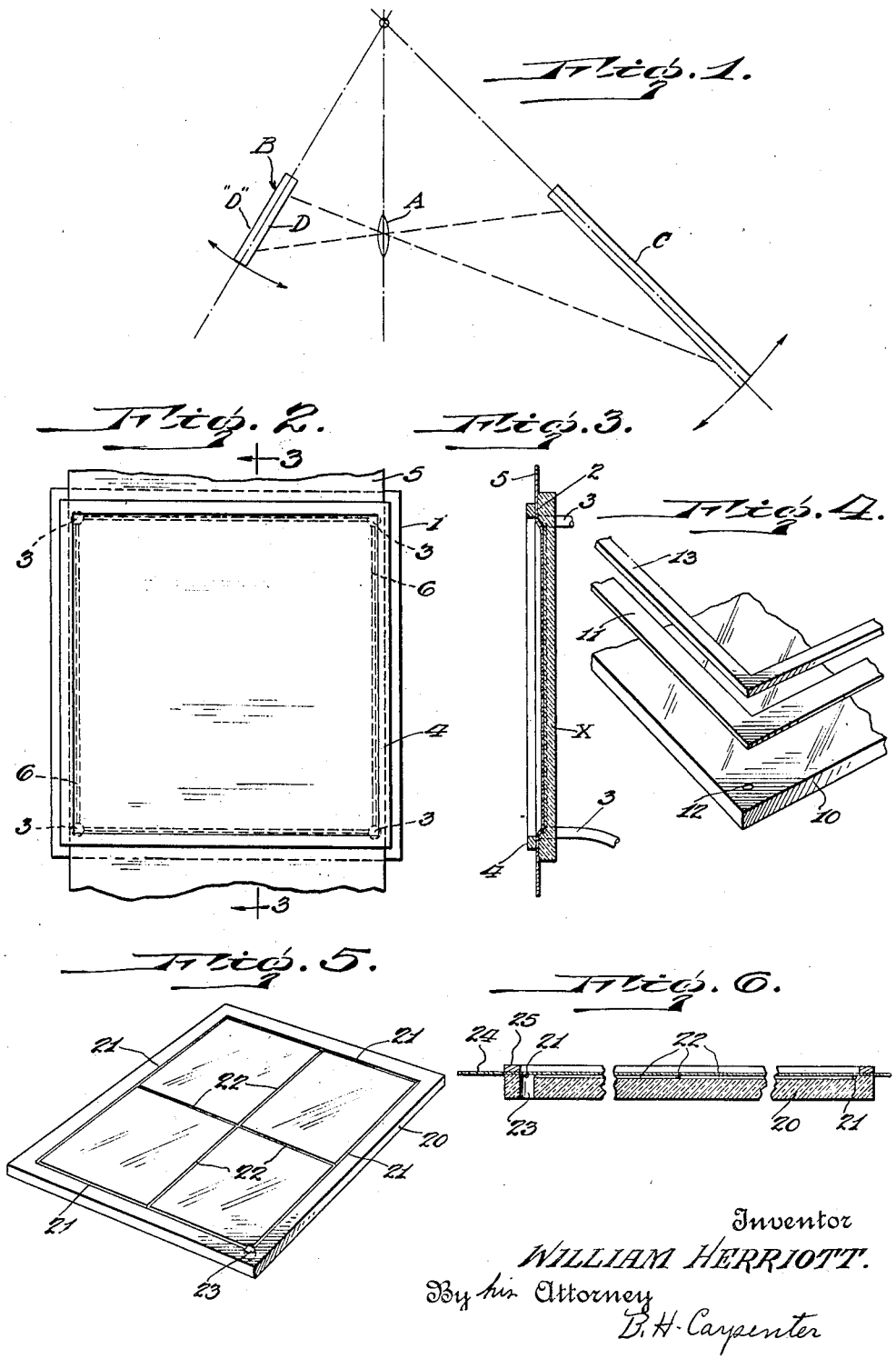
Inventor
WILLIAM HERRIOTT.
By his Attorney
B. H. Carpenter Patented Oct. 14, 1930

1,778,027

UNITED STATES PATENT OFFICE

WILLIAM HERRIOTT, OF FREEPORT, NEW YORK, ASSIGNOR TO FAIRCHILD AVIATION CORPORATION, OF NEW YORK, N. Y., A CORPORATION OF DELAWARE

TRANSFORMER PRINTING CAMERA

Application filed September 15, 1928. Serial No. 306,245.

This invention refers in general to transformer printing cameras and specifically to the support of the negative film therein.

In the transformer printing cameras now in use the film is supported between two plates of glass. This film is also supported at an angle to the optical axis of the printer lens, thus causing the light from different parts of the film to travel thru different lengths of glass path and also to pass through the glass at various angles. This results in a striking degradation of image quality at the steeper angles of incidence and also affects proper distribution of illumination.

It is the main object of this invention to obviate this difficulty by dispensing with the glass plate between the film and the printer lens.

Other objects and advantages of this invention will become apparent from the following description, claims and appended drawings, in which:—

Fig. 1 is a diagrammatic view showing the relative arrangement of the film lens and print receiving medium in a transformer.

Fig. 2 is a plan view of my improved film-supporting device.

Fig. 3 is a sectional view thereof on the line 3—3 of Fig. 2.

Fig. 4 is a distended perspective view with parts broken away of a modified construction of my device.

Fig. 5 is a perspective view of another modified form of my device.

Fig. 6 is a cross-sectional view of the modification shown in Fig. 5.

In Figure 1 of the drawings, I have disclosed only as much of the arrangement of the transformer printer now in use as is necessary for an understanding of my invention. The printer includes a lens A, a film support B, and a printing medium support C. As shown in Figure 1, the planes of all three intersect on a common line for reasons well known in the optical art. It will also be noticed that the film and likewise the print receiving medium are at an angle to the lens axis.

The film support B in common practice is composed of two glass plates D, one on each side of the film. Suitable means are provided for pressing the glass plates together to securely hold the film. The inner glass plate D, as has been before stated, causes poor image quality, uneven illumination etc. My invention obviates the necessity of the inner plate D to hold the film and thus eliminates the difficulties caused thereby.

Referring to Figs. 2 and 3, the film supporting device is composed of a glass plate of rectangular shape, but I do not desire to limit myself in any way to this particular shape. Around the periphery of the one face of the plate, a raised portion is formed in any suitable manner as by recessing the remainder of the face, by grinding or milling out, or by securing strips or a frame to the face of the glass plate adjacent to the periphery thereof. This glass plate 1 is mounted in the transformer printing camera with the raised portions on the inner side, that is to say, on the side nearest the lens A.

The glass plate 1 is provided with a plurality of suction ducts 3 communicating with the recessed face adjacent to the raised portion 2. As shown in the drawing, these ducts are four in number and extend thru the plate from the outside to the corners of the recess formed by the raised edge on the inner face. These ducts 3 may be connected to any suitable suction device. Suction channels 6 connect the various suction ducts, and, if desired, additional suction ducts may be provided extending across or part way across the recess portion. While I have shown only four suction ducts, I am well aware that under certain conditions a larger number might be desirable and in some cases a smaller number might suffice. I do not desire to limit myself to the number shown in the drawings nor to the positioning thereof adjacent to the corners of the recess.

A frame 4 is provided adjacent to the recessed face of the glass plate 1. This frame 4 is of a size and shape sufficient to press against the raised portion 2 entirely around the recess in the glass plate 1. The film 5 to be printed passes between the frame 4 and the recessed face of the glass plate 1, as shown in Figs. 2 and 3. Suitable means (not shown)

are provided for pressing the frame 4 toward the glass plate 1 to form a substantially airtight seal between the film 5 and the raised portion 2 of the glass plate 1. Suction applied thru the ducts 3 will draw the film 5 tightly against the bottom face of the recess and holds the same flat against the same. If found desirable, the raised portion 2 and the frame 4 may be faced with thin sheet rubber or other suitable material to prevent injury of the film 4 and to improve the air seal.

It will be seen from the above description that my invention provides a transparent support for the film in a given plane without the necessity of a glass plate between the film and the transformer printer lens. This construction obviates the poor image quality caused by the usual glass plate.

In Figure 4, I have shown a modified construction in which the recess is formed by securing a frame to the face of a glass plate. In this modification, the glass plate is designated by the numeral 10 and the frame by the numeral 11. The glass plate 10 is provided with suitable suction ducts 12 only one of which is shown. A frame 13 similar to the frame 4 of the first embodiment is also shown and serves the same purpose as in the first form of my invention. In the modification shown in this figure, the frame 11 may be of glass, metal, wood, fiber or other suitable material. The frame 11 may be secured to the glass plate 10 in any suitable manner as by adhesive etc., and may be faced with sheet rubber, if desired, on the side against which the film lies. It is obvious that the frame 11 could be replaced by separate strips secured to the glass plate and I desire that such a construction be considered within the purview of my invention. This modified construction lends itself to rapid and cheap yet durable manufacture.

In the modification shown in Figures 5 and 6, the raised portion is replaced by suction channels. In this modification, the glass plate is indicated by the numeral 20. A suction channel 21 extends around one face of the plate near the periphery and cross channels 22 extend across the plate and connect at their ends with the channel 21. A suction duct 23 communicates with the channel 21 at a suitable point, for instance, near one corner of the plate 20. The film 24 is held against the face of the plate 20 by a frame 25, similar to the frame 4 of Figures 2 and 3, which produces an air seal preferably just outside of the channel 21. Suction now applied thru the duct 23 will withdraw the air through the channels 21 and 22 thus causing the film 24 to be forced tightly against the glass plate 20 by the atmospheric pressure on the outside of the film.

In this embodiment as in all the embodiments described above, the glass plate is between the source of illumination and the film. There is no change of medium between the film and the lens of the printer.

Various changes in the construction of the embodiment illustrated in the drawings may be made without departing from the spirit of the invention, and I do not therefore desire to limit myself to the specific construction shown and described but to interpret the invention broadly within the scope of the appended claims.

What I claim as my invention is:

1. In a transformer printing camera having a lens and a film position, a print receiving medium position angularly disposed with relation to the axis of said lens, a single transparent film supporting plate mounted at said film position and facing said lens at an angle to the axis thereof and formed with a raised portion extending around the periphery of the face adjacent to said lens and with suction ducts opening within the space bounded by said raised portions, and a frame for holding a film against said raised portion whereby suction applied to said suction ducts will rarify the air between the film and the plate and draw the film tightly against the plate and expose said film to said lens with air as the sole intervening medium.

2. In a transformer printing camera having a lens and a film position, a transparent film supporting plate having channels formed in the face thereof nearest the lens and with a suction duct communicating with said channels, a frame for holding a film against said face outside said channels, whereby suction applied to said suction duct will rarify the air between the film and said plate and draw the film against said plate and hold said film angularly disposed with relation to the axis of said lens with air as the sole intervening medium.

3. The combination in a transformer printing camera, a lens, a film positioning device and a print receiving medium positioning device angularly disposed in relation to each other and to the axis of said lens arranged therebetween, each of said devices comprising a single transparent supporting plate arranged only on the outer faces of that supported, and suction means adapted to accomplish such support, whereby said film and print receiving medium are directly exposed to said lens with air as a sole intervening medium.

In testimony whereof I affix my signature.
WILLIAM HERRIOTT.